United States Patent [19]

Sinclair et al.

[11] Patent Number: 4,494,565
[45] Date of Patent: Jan. 22, 1985

[54] INDICATOR ASSEMBLY

[75] Inventors: Franklin H. Sinclair, Oradell; Gary Glockner, Hillsdale, both of N.J.

[73] Assignee: Westlock Controls Corporation, Moonachie, N.J.

[21] Appl. No.: 470,464

[22] Filed: Feb. 28, 1983

Related U.S. Application Data

[63] Continuation-in-part of Ser. No. 367,038, Apr. 9, 1982.

[51] Int. Cl.³ ............................................. F16K 37/00
[52] U.S. Cl. .................................... 137/555; 137/556; 137/625.41; 137/625.47; 116/271; 116/277
[58] Field of Search ................... 137/555, 556, 625.41, 137/625.47, 625.46; 116/271, 277

[56] References Cited

U.S. PATENT DOCUMENTS

| | | | |
|---|---|---|---|
| 3,148,701 | 9/1964 | Boswell | 137/556 |
| 3,238,968 | 3/1966 | Pecis | 137/556 |
| 3,460,565 | 8/1969 | Sanderson | 137/555 |
| 3,771,765 | 11/1973 | Scapes | 137/625.47 |
| 4,219,021 | 8/1980 | Fink | 137/625.41 |
| 4,311,169 | 1/1982 | Gaillard | 137/625.41 |
| 4,355,659 | 10/1982 | Kelchner | 137/625.47 |

Primary Examiner—A. Michael Chambers
Attorney, Agent, or Firm—Louis E. Marn

[57] ABSTRACT

There is disclosed a novel indicator assembly comprised of a housing member mounted to a fluid handling apparatus and an indicator member mounted for rotation within the housing member operationally associated to a moving member of the fluid handling apparatus wherein the housing member is provided with transparent sectors permitting visual observation of the indicator member and wherein the indicator member is provided with colored sectors to visually cooperate with the transparent sectors of the housing member to indicate operational modes of the fluid handling apparatus.

6 Claims, 5 Drawing Figures

INDICATOR ASSEMBLY

This application is a continuation-in-part of application Ser. No. 367,038 filed Apr. 9, 1982.

Field of the Invention

This invention relates to an indicator assembly, and more particularly to an indicator assembly for the visual observance of the operational setting of a fluid handling apparatus having multiple operational settings, such as three-way valve.

BACKGROUND OF THE INVENTION

Fluid handling apparatus have been provided with external indicators permitting visual observation of the relative operational positioning of the valve plug and sleeve of the valve wherein the rotatable spindle to which the valve plug is mounted is actuated through a manually actuated lever arm or the like. Generally, visual observation of the operational positioning of the spindle and the valve plug and sleeve of such a valve assembly requires relatively close visual inspection, and in particular, with respect to manually operated lever arms, vertical inspection from a position above the lever arm and spindle. Thus, in the event of a disabling condition in the plant in which such valve assembly is included, it would be necessary to require operating personnel to come into close proximity with each valve assembly to ascertain the operational setting thus possibly exposing such operational personnel to dangerous and hazardous situations.

In the aforementioned copending application, there is disclosed an indicator assembly for a fluid handling apparatus, such as a valve, and comprised of a housing member mounted to a fluid apparatus and an indicator member mounted for rotation within the housing member operationally associated to a moving member of the fluid handling apparatus. The housing member is provided with transparent sections permitting visual observation of the indicator member provided with colored sectors to visually cooperate with the transparent sectors of the housing member to indicate an open or closed mode of the fluid handling apparatus.

The present invention permits the visual observation from a distance of the operational mode of the fluid handling apparatus having at least three fluid ports for ascertaining the direction of flow of fluid through the fluid handling apparatus.

OBJECTS OF THE INVENTION

An object of the present invention is to provide a novel indicator assembly for fluid handling apparatus having at least three fluid ports to permit instant visual indication of the operational setting thereof.

Another object of the present invention is to provide a novel indicator assembly for fluid handling apparatus having at least three fluid ports to permit instant visual indication of the operational setting thereof from remote distances.

Still another object of the present invention is to provide a novel indicator assembly for fluid handling apparatus having at least three fluid ports to permit instant visual indication of the operational setting thereof from substantially any angle of observation.

A further object of the present invention is to provide a novel indicator assembly for process apparatus having at least three fluid ports to permit instant afar visual indication of the operational setting thereof to reduce operating personnel exposure to potential dangerous and/or hazardous conditions.

A still further object of the present invention is to provide a novel indicator assembly for fluid handling apparatus having at least three fluid ports to permit instant visual indication of the operational setting thereof and the flow of fluid there through, and comprised of no external moving parts which may be affected by the surrounding environment.

Yet a further object of the present invention is to provide a novel indicator assembly for fluid handling apparatus having at least three fluid ports to permit instant visual indication of the operational setting thereof and visual demonstration of the direction of flow of fluid through the valve handling device, conveniently retrofitted on such fluid handling apparatus.

SUMMARY OF THE INVENTION

These and other objects of the present invention are achieved by an indicator assembly comprised of a housing member this indicator member mounted for rotation within the housing member operationally associated to a moving member of the fluid handling apparatus wherein the housing member is provided with transparent sectors permitting visual observation of the indicator member and wherein the indicator member is provided with colored sector to visually cooperate with the transparent sectors of the housing member to indicate the fluid flow through the fluid handling apparatus, as more fully herein disclosed.

BRIEF DESCRIPTION OF THE DRAWINGS

A better understanding of the present invention as well as other object and advantages thereof will become apparent upon condieration of the detailed disclosure thereof, especially when taken with the accompanying drawing, wherein.

DETAILED DESCRIPTION OF THE DRAWINGS

Figure 1:
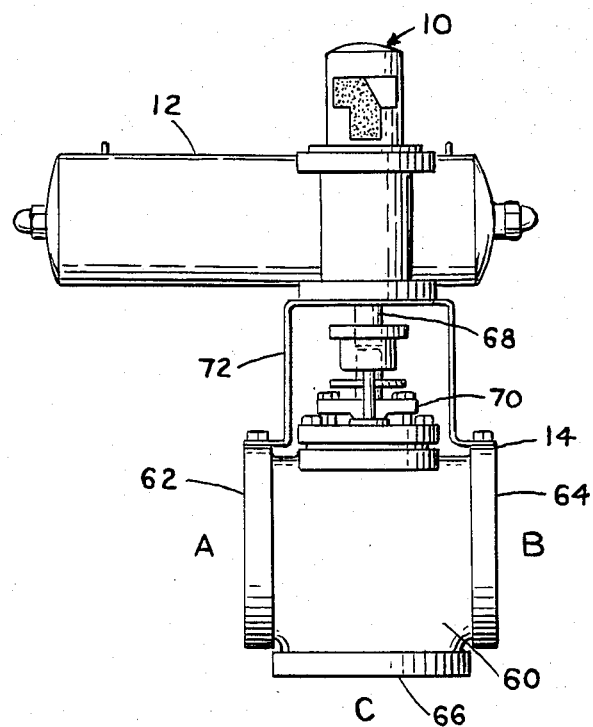
FIG. 1 is an elevational view of the indicator assembly of the present invention mounted on a fluid handling apparatus.

Referring now to the drawings, there is illustrated an indicator assembly of the present invention, generally indicated as 10, mounted on an acutator assembly associated with and driving a three-way valve assembly, generally indicated as 12 and 14, respectively.

Figure 5:
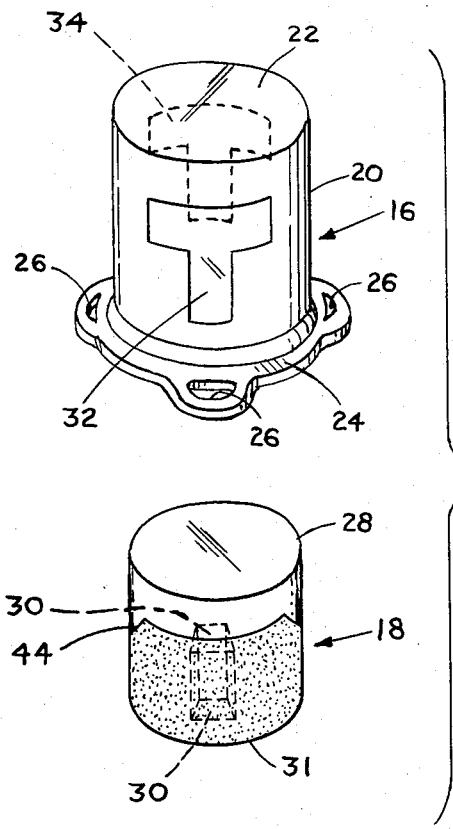
FIG. 5 is an exploded view of the major components of the indicator assembly of the present invention.

The indicator assembly 10, referring particularly to FIG. 5, is comprised of a cylindrically-shaped housing member in which disposed for rotation there is positioned a cylindrically-shaped indicator member, generally indicated as 16 and 18, respectively. The cylindrically-shaped housing member 16 is formed by a cylindrically-shaped sidewall 20 enclosed by a top end wall 22 and including a disc-shaped outwardly extending mounting ring member 24 including mounting orifices 26 formed opposite the top end wall 22. The cylindrically-shaped solid body member 28 has a rectangularlyshaped chamber 30 in lower end portion 31 thereof, as more fully hereinafter described.

The indicator assembly 10 of the present invention may be formed of any suitable material given the prerequisite visual characteristics and conditions to which the indicator assembly 10 may be subjected during use. Generally, the housing member 16 and indicator member 18 of the indicator assembly 10 are formed of a thermoplastic material, such as plexiglass, polycarbonates or the like; materials exhibiting resistance to high temperatures and possessing excellent mechanical and chemical properties. Preferably, housing member 16 is formed of transparent or translucent thermoplastic material for visual acuity, as will become apparent to one skilled in the art.

As hereinabove mentioned, the respective parts of the indicator assembly 10 are provided with selectively deposited layers of paint or pigment material, decal or the like, referring again more particularly to FIG. 5. Selective deposition of the paint or pigment material is preferably coated on the interior surface of the sidewall 20 of the housing member 16, however, processing limitations may require coating on the exterior surface thereof. T-shaped transparent areas 32 and 34, respectively, disposed 180 degrees from each other, on sidewall 20 of housing member 16. T-shaped transparent areas 32 and 34, respectively, represent graphically the three-way valve 14 and the flow-through ports 62, 64 and 66 of three-way valve 14, as more fully hereinafter described.

Cylindrically-shaped solid body member 28 of indicator member 18 has deposited thereon, a paint or pigment material or decal or the like, generally indicated as 44. A portion of the paint, pigment material or decal or the like corresponding to the vertical leg of the T-shaped areas extend about a circumferential portion of the cylindrically-shaped solid body member 28 slightly in excess of 180 degrees. An upper portion of the paint, pigment, etc. corresponding to the horizontal arm portions of the T-shaped area extends less than 180 degrees and is formed with angularly-disposed boundary lines 44a and 44b to correspond to operational modes, as more fully hereinafter discussed.

Any color of paints or pigment material or decal or the like may be used. In this context, the color coating may reflect reference to the ANSI standard for piping systems, e.g. yellow-hazards; green-liquid materials slightly hazardous; blue-gaseous materials slightly hazardous; and red-fire quenching. In the present invention a desired color of paint, for example, yellow, is applied to the sidewall 20 of indicator member 16 such that there remains two transparent T-shaped areas 32 and 34. A predetermined color configuration is thereafter selected for pigmented area 44 of cylindrically-shaped solid body member 28 of indicator member 18. Pigmented area 44 thereby disclosed through transparent windows 32 or 34 positioning of valve 14.

Figures 2, 3, 4:
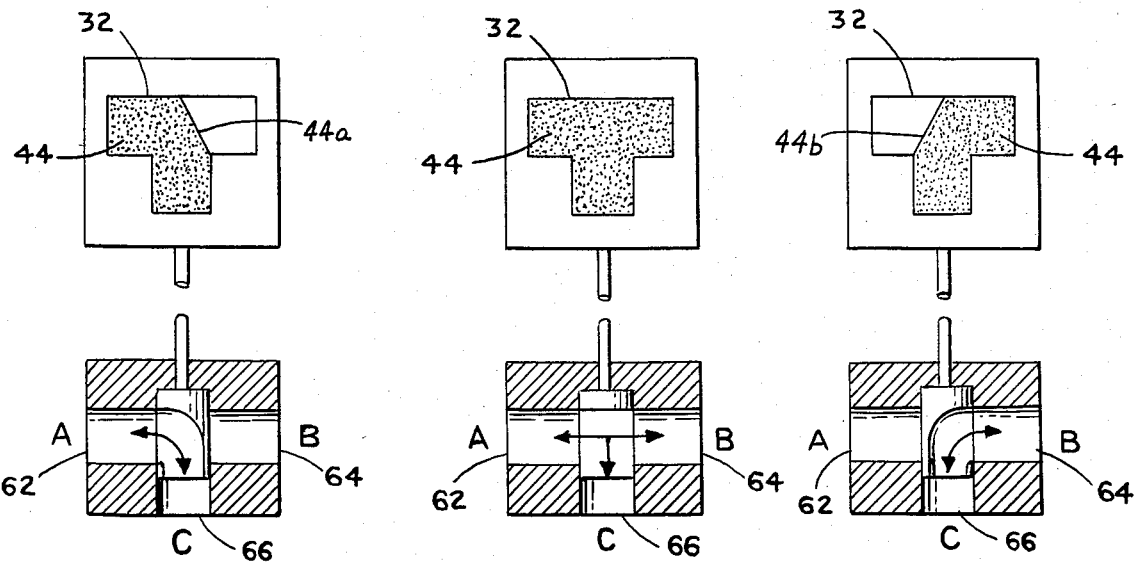
FIG. 2 is a side view, partially cut away, of the indicator assembly in FIG. 1.
FIG. 3 is a side view, partially cut away, of the indicator assembly in FIG. 1.
FIG. 4 is a side view, partially cut away, of the indicator assembly in FIG. 1.

In reference to FIGS. 2, 3, and 4, the positioning of pigmented surface 44 with respect to T-shaped transparent areas 32 or 34 indicates the fluid flow through ports 62, 64, and 66 or valve 14. In FIG. 2, fluid flow is between ports 62 and 66 of valve 14 and pigmented area 44 in conjunction with T-shaped transparent windows 32 and 34 would disclose visually, this flow in both transparent T-shaped windows 32 and 34. In FIG. 3, fluid flow is occurring between ports 62, 64 and 66 and pigmented area 44 would disclose this flow in cooperation with T-shaped transparent window 32 with T-shaped transparent window 34 being shielded entirely from the pigmented area 44. In FIG. 4, fluid flow in the valve 14 is between ports 64 and 66 and pigmented area 44 in cooperation with T-shaped transparent window 32 and 34 would disclose visually such fluid flow. It will be understood by one skilled in the art, that the visual of T-shaped transparent window 34 with regard to fluid flow of FIG. 2 and 4 is a mirror image, respectively, of FIGS. 2 and 4.

As illustrated in FIG. 1, the indicator assembly of the present invention is to be associated with valve assembly 14 under the control of pneumatic actuator assembly 12. The valve assembly 14 is comprised of a valve housing 60 including inlet and outlet ends 62, 64 and 66, respectively, and a valve spindle 68 for the mounting of valve plug and sleeve 69 (not shown). Valve housing 60 is formed with a valve spindle packing assembly, generally indicated 70, to permit the rotation of the valve spindle 68 under fluid tight conditions.

On the valve assembly 60, there is provided a bracket 72 for mounting the actuator assembly 12. Valve spindle 68 extends upwardly through bracket 72 for connection with actuator assembly 12 and a portion of valve spindle 68 extends upwardly above actuator assembly 12 for use and means for connecting the indicator member 18 of the indicator assembly 10 to the pneumatic actuator assembly 12. The upwardly extending portion of valve spindle 68 which extends above actuator assembly 12 is rectangular in shape such that it it disposed within rectangular-shaped chamber 30 of indicator member 18. Indicator housing 16 is thereby mounted over the upwardly extending portion of valve spindle 68 and is removably secured to the actuator assembly 12 in a manner such that the radial surface sections of indicator member 18 are visible through transparent T-shaped windows 32 and 34.

In operation, the movement of valve spindle 68 by actuator assembly 12 simultaneously causes the repositioning of cylindrically-shaped indicator member 18 within cylindrically-shaped housing member 16 to visually identify the positioning of the valve and the direction of flow, as hereinabove described with reference to FIGS. 2, 3 and 4.

While the invention herein has been described in connection with an exemplary embodiment thereof, it will be understood that many modifications will be apparent to those of ordinary skill in the art and that this application is intended to cover any adaptions or variations thereof. Therefore, it is manifestly intended that this invention be only limited to the claims and the equivalents thereof.

What is claimed:

1. An indicator assembly visually indicating operational settings of a valve having a plurality of at least three flow-through ports, said valve including a rotatable operational member for selectively placing said valve in a first operational mode, a second operational mode or a third operational mode, said indicator assembly being comprised of:

an indicator member comprised of first and second surface sections, said first surface section being provided with an indicator means having a shaped configuration portions of which are selectively referenced to said first operational mode, said second operational mode and said third operational mode, said indicator member being rotatable by said operational member of said valve; and a housing member having an elongated chamber within which said indicator member is positioned for axial rotation, said housing member including a first translucent section having a shaped configuration representing graphically said plurality of at least three flow-through ports, portions of said indicator means included in said first surface section of said indicator member being selectively visible through said first translucent section when said operational member places said valve in said first operational mode, said second operational mode, or said third operational mode.

2. The indicator assembly as defined in claim 1 wherein said indicator member is cylindrically shaped, and said housing member is formed with a cylindrically-shaped chamber for receiving said cylindrically-shaped indicator member.

3. The indicator assembly as defined in claim 2 wherein said first surface section of said indicator member is comprised of a radial surface portion of approximately 190 degrees, and said housing member includes a second translucent section disposed on said housing member 180 degrees apart from said first translucent section, said first and second translucent sections each having a T-shaped configuration representing graphically three flow-through ports of said valve.

4. A valve assembly which comprises:
a valve housing including three flow-through ports;
a valve spindle disposed in said three-way valve housing;
a valve plug mounted for rotation on said spindle between three open positions;
an indicator member comprised of first and second surface sections, connected to said valve spindle of said valve housing, said first surface section being provided with an indicator means of a first color and having a shaped configuration portions of which are selectively referenced to a first operational position of said valve plug, a second operational position of said valve plug and a third operational position of said valve plug, and said second surface section being of a second color; and
a housing member having an elongated chamber within which said indicator member is positioned for axial rotation, said housing member including a first translucent section having a T-shaped configuration, portions of said indicator means included in said first surface section of said indicator member being selectively visible through said first translucent section when said spindle is in said first, second or third operational position.

5. The valve assembly as defined in claim 4 wherein said indicator member is cylindrically shaped, and said housing member is formed with a cylindrically shaped chamber for receiving said cylindrically shaped indicator member.

6. The valve assembly as defined in claim 5 wherein said first surface section of said indicator member is comprised of a radial surface portion of approximately 190 degrees, and said housing member includes a second translucent section having a T-shaped configuration and disposed on said housing member 180 degrees apart from said first translucent section.

* * * * *